Patented May 31, 1949

2,471,502

UNITED STATES PATENT OFFICE 2,471,502

METHOD OF IMPROVING FERMENTED BEVERAGES AND PRODUCT OBTAINED THEREBY

James S. Wallerstein, New York, N. Y., Eduard Farber, New Haven, Conn., and Ralph T. Alba, New York, N. Y., assignors, by mesne assignments, to Wallerstein Company, Inc., New York, N. Y., a corporation of New York No Drawing. Application August 12, 1944, Serial No. 549,298

12 Claims. (Cl. 99—52)

This invention relates to a method of improving fermented beverages of mildly acid nature derived at least in part from cereals, like beer, ale, porter and stout, particularly with respect to their stability, appearance and taste.

It is known to treat fermented cereal beverages like beer with various proteolytic enzymes either before or after the bottling in order to modify or decompose those components which, while soluble in the mildly-acid beverage, are capable of causing clouding of the beverage on storage or on agitation, and particularly on subjection to changing temperatures, as to repeated chilling and warming.

The present invention provides a method of accomplishing results similar to those obtained heretofore by the use of proteolytic enzymes but to a more thoroughgoing extent; so much so that beverages treated in accordance with the invention can withstand conditions, such as chilling to very low temperatures and even to actual freezing without loss of brilliance where the enzymatically treated beverages would show clouding and precipitation. The present invention aims further to provide a method of improving fermented beverages by the use of inexpensive material and especially of a material which can be recovered during the process and regenerated for further use. It is a further object of the invention to provide a method of improving beverages of the type indicated which can be carried out in a very short period of time and which can be put into effect during the normal course of manufacture of the beverage, and involves no disturbance or change in the particular method of brewing and after treatment which may be employed in any particular brewery.

According to the present invention a beverage, either during the fermentation or afterwards and before the bottling, is subjected to the action of a water-insoluble form of lignin in order to remove, among others, those substances which are irreversibly precipitated on repeated chilling, or on freezing, of the fermented beverage. The action of the lignin is quite rapid, and the treatment does not materially increase the time involved in the brewing process as a whole.

In our co-pending application entitled "Stabilized fermented beverages and method of manufacturing same," Serial No. 549,297, filed simultaneously with the present application and subsequently substituted by application Serial No. 584,733, filed March 24, 1945, there is described a process for eliminating from fermenting or fermented beverages certain substances which cause clouding on repeated chilling and warming by the use of a water-soluble form of lignin. Application Ser. No. 549,297 has now become abandoned, and application Ser. No. 584,733 has matured into Patent No. 2,470,006, May 10, 1949. It is probable that certain of the undesirable substances in the beverage are removed by both forms of lignin, i. e., the water-soluble and the water-insoluble forms. We have found, however, that the water-insoluble form of lignin precipitates certain additional undesirable substances which affect the taste and flavor of the beverage, which substances are not precipitated by the water-soluble forms of lignin. Also, whereas the action of the water-soluble form of lignin is probably chemical in nature, at least to a major extent, that of the water-insoluble lignin appears to be a large extent physical, namely, that of adsorption; it is possible, however, that the insoluble lignin is able to form insoluble molecular complexes with certain of the dissolved components of the beverage which are unaffected by the water-soluble lignins.

We have found further that in addition to removing those colloidal or other substances which cause clouding or haze on chilling, the use of the insoluble lignins presents the further advantages of reducing the intensity of the color and in removing materials which undesirably affect the taste and flavor and which may be present in the fermented wort. In this respect the insoluble lignins are superior to activated carbon for they leave the desirable flavor-giving components in the fermented liquor, so that the full bouquet and aroma of the beverage is retained, whereas activated carbon tends to remove all color and flavor-giving materials indiscriminately.

The water-insoluble forms of lignin which are suitable for use in the carrying out of the present invention are those derived industrially from the acid hydrolysis of wood, for example, the residue remaining after the solubilization of the cellulose and other carbohydrates by strong mineral acids, like hydrochloric or sulphuric; such forms of lignin are commonly produced from birch, pine, spruce and other species of wood. It is advantageous to add these water-insoluble lignins to the fermented wort during the storage period during which time the lignin can be made to permeate the whole body of liquid, the insolubles being removed at the end of the storage. Such a treatment removes proteins and other substances of unknown nature which are responsible for the haze and turbidity formation in the finished beverage.

It is of advantage to activate the lignin before adding it to the beverage by heating it first in alkali solution, such as dilute sodium hydroxide solution, and then in acid solution, as in dilute hydrochloric acid, and thereafter washing it free of acid. By this treatment the lignin is also freed of any soluble components that it might contain, so that these are not left behind in the beverage.

The amount of lignin to be employed will depend upon the amount of matter which any particular fermented liquor will require to be removed to insure a clear and brilliant appearance at all times. The amount will vary with the character of the cereal from which the beverage is brewed; and the required amount can be determined by simple experiment for any particular case. However, in view of the insolubility of the lignin, the use of an excess will work no harm.

The insoluble lignin may also be added during the kettle boil following mashing, and will thus make possible a cleaner and purer fermentation.

Treatment of the liquor with water-insoluble lignin is of particular advantage where wheat is employed as the brewing material and the tendency to haze and turbidity formation is especially pronounced. It can be employed in conjunction with treatment with chill-proofing enzymes in accordance with known procedures, in which case only very small quantities of the insoluble lignin will be required. It may similarly be employed after a pre-treatment with water-soluble lignins in accordance with the process described in the above-mentioned application.

Treatment of the liquor before, during or after fermentation with the insoluble lignin has been found by actual test to render the beverage completely stable against prolonged and repeated chilling and heating, and as already indicated, even against actual freezing, and also against prolonged agitation. The beverage is rendered less sensitive to the presence of heavy metals, most notably tin, which may cause turbidities in a concentration of one part to one hundred million. This is of special significance in view of the marketing of beverages like beer for home use in metal containers. One of the important features of our invention resides in the fact that the treating agent, namely the water-insoluble lignin, may be re-utilized after regeneration in a manner similar to that used for its original activation, that is, by treatment with alkali followed by treatment with acid and washing.

It will be understood that where we speak of a water-insoluble lignin we have reference also to one which is insoluble also under the slightly acid conditions existing in a fermented liquor.

In the following example a preferred procedure is described in detail for purposes of illustration.

*Example*

An all malt beer is fermented, the yeast removed and the beer stored for several weeks at cold temperatures. Thereafter, the fermented brew is intimately mixed with about 0.2% of water-insoluble pine lignin activated as described above and in finely divided form. The mixture is stirred thoroughly for a period of several minutes at a temperature of the order of 10° C. Thereafter, the lignin and absorbed material are removed as by filtration, and the beer treated in the usual manner.

The resulting finished beverage has a good foam and fine flavor. In contrast to a control made from the same beer without the treatment according to the invention, it does not develop any haze or deposit any insoluble matter on cooling to 0° C., or on prolonged agitation or repeated chilling and warming.

We claim:

1. The method of improving fermented beverages of mildly acid nature derived from cereals and containing normally organic components of proteinaceous nature which are soluble in mildly acid medium but are capable of causing turbidity on changes of temperature, comprising bringing the beverage at any stage during its manufacture into intimate contact with a water-insoluble and acid-insoluble lignin remaining after acid-hydrolyzing the carbohydrates of wood, while maintaining the pH value of the beverage liquor in the acid range, and thereby forming an insoluble complex of the lignin with said components, and separating the beverage from said complex.

2. The method of improving fermented beverages of mildly acid nature derived from cereals and normally containing organic components of proteinaceous nature which are soluble in mildly acid medium but are capable of causing turbidity on changes of temperature, comprising mixing and stirring the beverage at any stage during its manufacture into intimate contact with a water-insoluble and acid-insoluble lignin remaining after acid-hydrolyzing the carbohydrates of wood, while maintaining the pH value of the beverage liquor in the acid range, and thereby forming an insoluble complex of the lignin with said components, and separating the beverage from said complex.

3. The method according to claim 1, wherein the beverage is one derived from wheat.

4. The product of the process of claim 1.

5. The method according to claim 1, in which the lignin is added to the fermented beverage at the beginning of storage and removed at the end of storage.

6. The method according to claim 1, in which the lignin is first activated by treatment with hot aqueous solutions of alkali and acid and washed free of water-soluble materials.

7. The method according to claim 1 applied to a beverage which has been pre-treated with a water-soluble form of lignin.

8. The method according to claim 1, in which the insoluble lignin is added during the kettle boil.

9. The method of improving fermented beverages of mildly acid nature derived from cereals and normally containing organic components of proteinaceous nature which are soluble in mildly acid medium but are capable of causing turbidity on changes of temperature, comprising bringing the beverage after the fermentation thereof into intimate contact with a water-insoluble and acid-insoluble lignin remaining after acid-hydrolyzing the carbohydrates of wood and thereby forming an insoluble complex of the lignin with said components, and separating the beverage from said complex.

10. The method of improving fermented beverages of mildly acid nature derived from cereals and normally containing organic components of proteinaceous nature which are soluble in mildly acid medium but are capable of causing turbidity on changes of temperature, comprising mixing and stirring the beverage at any stage during its manufacture into intimate contact with approximately 0.2% of its weight of the water-insoluble lignin remaining after acid-hydrolyzing the carbohydrates of wood and thereby forming an insoluble complex of the lignin with the said components and separating the beverage from said complex.

11. The product of the process of claim 9.
12. The product of the process of claim 10.

JAMES S. WALLERSTEIN.
EDUARD FARBER.
RALPH T. ALBA.

REFERENCES CITED

The following references are of record in the file of this patent:

UNITED STATES PATENTS

| Number | Name | Date |
|---|---|---|
| 1,427,682 | Graham | Aug. 29, 1922 |
| 2,080,138 | Krebs | May 11, 1937 |
| 2,108,317 | Miller | Feb. 15, 1938 |
| 2,200,784 | Wallace | May 14, 1940 |
| 2,223,753 | Wallerstein | Dec. 3, 1940 |
| 2,269,315 | Nelson et al. | Jan. 6, 1942 |
| 2,415,439 | Nelson | Feb. 11, 1947 |

OTHER REFERENCES

"Water Treatment," Article in Chemical Trade Journal and Chemical Engineer, January 16, 1942, page 70.

Industrial Chemistry, by A. Rogers, 3d ed., 1921, published by D. Van Nostrand Co., New York, N. Y., page 940.

The Chemistry of Wood, by Hawley and Wise, 1926, published by Chemical Catalog Co., Inc., New York, N. Y., pp. 44, 45, 47, 79.